(12) United States Patent
Jensen et al.

(10) Patent No.: US 6,249,166 B1
(45) Date of Patent: Jun. 19, 2001

(54) PIPELINED PROGRAMMABLE DIGITAL PULSE DELAY

(75) Inventors: Don Charles Jensen; Mark Lewis Lyman; Trenton Wayne Grossarth, all of Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/426,391

(22) Filed: Oct. 22, 1999

(51) Int. Cl.[7] .................................................. H03H 11/26
(52) U.S. Cl. ............................................. 327/276; 277/261
(58) Field of Search ................................... 327/270, 269, 327/276, 261, 277

(56) References Cited

U.S. PATENT DOCUMENTS

| | | | |
|---|---|---|---|
| 5,570,294 | * 10/1996 | McMinn et al. | 327/276 |
| 5,878,097 | * 3/1999 | Hase et al. | 375/371 |
| 5,936,977 | * 8/1999 | Churchill et al. | 371/22.31 |

\* cited by examiner

*Primary Examiner*—Dinh T. Le
(74) *Attorney, Agent, or Firm*—Maurice J. Jones; Frank J. Bogacz

(57) ABSTRACT

A pipelined programmable digital pulse delay system (10) that is capable of processing multiple input pulses simultaneously, each with a unique programmed delay value, includes a plurality of pulse delay units (12, 14, 16), a plurality of buffer registers (18, 20, 22, 24), and a commutator unit 26. The buffer registers (18, 20, 22, 24) each store a delay control word corresponding to a single pulse currently being processed in the system (10). The plurality of pulse delay units (12, 14, 16) each reference a corresponding buffer register (18, 20, 22, 24) for an appropriate delay control value when a particular pulse is about to be received by the pulse delay unit. After the pulse has passed an operative point in the pulse delay unit, the unit then retrieves a delay control value from another buffer register (18, 20, 22, 24) for use with a next input pulse. Thus, pipelined operation is achieved in the system (10).

20 Claims, 2 Drawing Sheets

PIPELINED PROGRAMMABLE DIGITAL PULSE DELAY

FIELD OF THE INVENTION

The invention relates generally to pulse delay systems and, more particularly, to programmable pulse delay systems.

BACKGROUND OF THE INVENTION

A programmable pulse delay line is a device that is capable of providing a variable amount of time delay to input pulses based on an input control signal. Typically, pulse delay lines include a number of serially connected switchable delay units through which an input pulse must flow. A binary control value is programmed into the delay line for setting the delay of each of the switchable delay units in a predetermined manner. A pulse is then allowed to flow through the pulse delay line, which delays the pulse by the programmed amount. After the pulse has left the last switchable delay unit, another binary control value can be applied to the delay line for use with another input pulse. The switchable delay units will often have switchable delay values that are binarily weighted (i.e., by factors of two) so that the total amount of delay introduced by the units will be equal to the binary control value multiplied by a constant delay value $\theta$.

A problem with conventional programmable delay lines is that the programming update rate of the delay line is limited by the maximum delay of the delay line. That is, a new binary control value cannot be programmed into the delay line until it is certain that the trailing edge of a previous pulse has passed the switch in the last switchable delay unit. Otherwise, the previous pulse could be cutoff or distorted. This restraint seriously limits the capabilities of the pulse delay system because only one of the switchable delay units is being used (i.e., is propagating a pulse) at any instant in time. Thus, system resources are being under-utilized and system speed is sub-optimal.

Therefore, there is a need for a programmable pulse delay system that is capable of providing a program update rate that is not limited by the maximum delay of the system. There is also a need for a programmable pulse delay system that is capable of providing enhanced utilization of system resources.

DETAILED DESCRIPTION OF A PREFERRED EMBODIMENT

The present invention relates to a pipelined programmable pulse delay system that is capable of processing multiple pulses within a delay line simultaneously, with each of the pulses having a unique programmed delay value. The system uses a group of switchable pulse delay units arranged in a serial fashion to delay input pulses by a variable programmed amount. A number of control registers are provided to store binary control words for each pulse currently being processed by the system. As each pulse propagates through the series of pulse delay units, each successive pulse delay unit retrieves a control value corresponding to the incoming pulse from a specific control register associated with that pulse. The pulse delay unit then configures itself using the retrieved control value so that a programmed amount of delay is applied to the pulse. Thus, each pulse delay unit is continuously being reconfigured on a pulse by pulse basis independently from the other pulse delay units in the system. In this manner, pipelined operation is achieved which significantly increases the speed of operation of the system. The principles of the present invention can be used to increase the speed of a pulse delay system by up to a factor of N, where N is the number of pulse delay units in the system.

A programmable pulse delay system in accordance with the present invention can be used in many different applications. The system can be used, for example, as a standalone digital delay line for use in, among other things, communications applications. Alternatively, the programmable pulse delay system can be used in high speed signal generation systems or synthesizers to generate highly accurate output pulse streams having little spurious content. The system can also be used in frequency hopping synthesizers, fast set-on receivers, or in a period-chirp synthesizer for use in radar applications. Many other applications are also possible.

Figure 1:
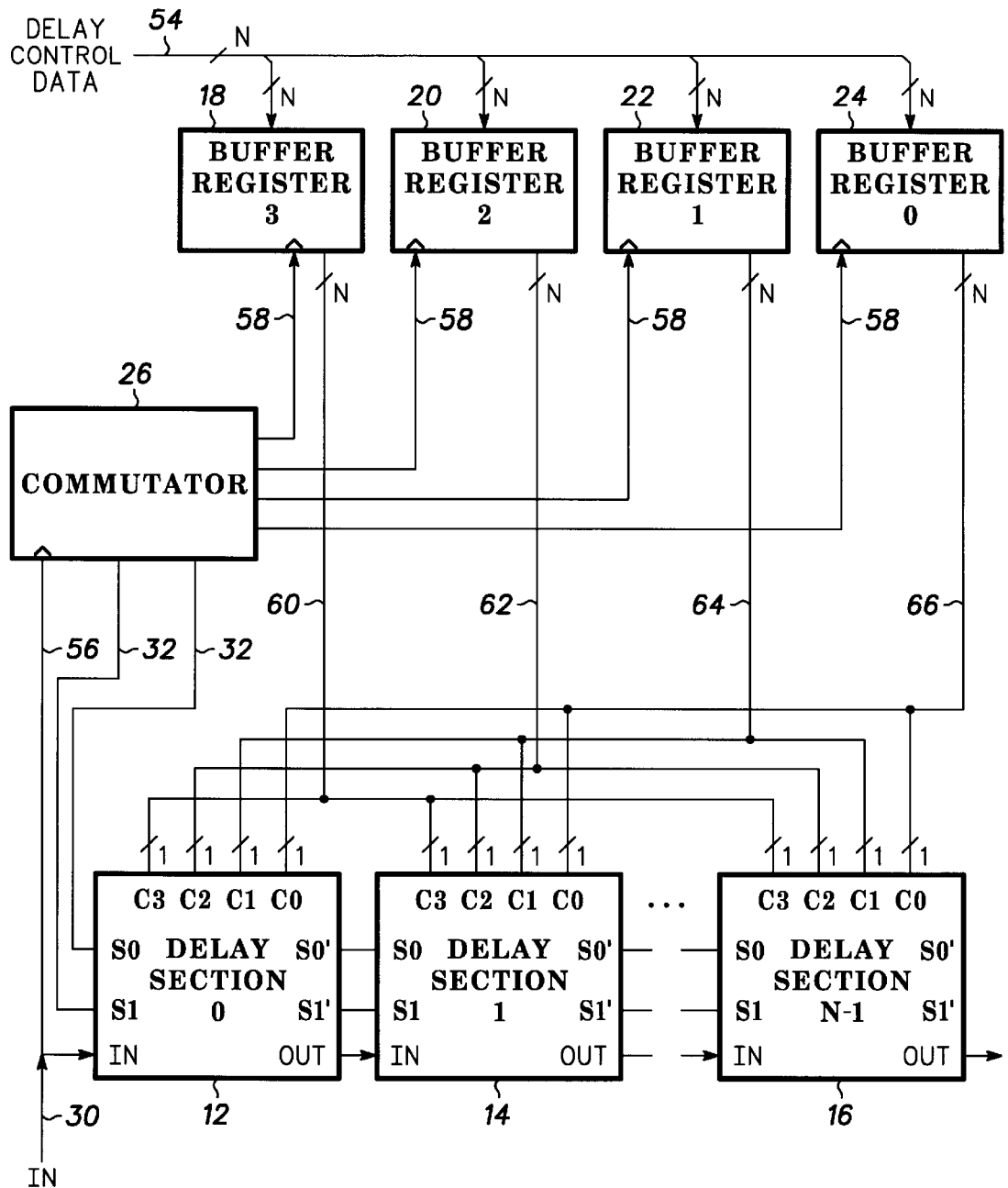
FIG. 1 is a block diagram illustrating a programmable pulse delay system in accordance with one embodiment of the present invention.

FIG. 1 is a block diagram illustrating a pipelined digital pulse delay system 10 in accordance with one embodiment of the present invention. As illustrated, the system 10 includes: a plurality of pulse delay units 12, 14, 16, a plurality of buffer registers 18, 20, 22, 24, and a commutator unit 26. The pulse delay units 12, 14, 16 are connected to one another in a serial arrangement. Thus, a pulse input to a first of the pulse delay units 12 will flow through each of the other pulse delay units before being output by a last of the pulse delay units 16. Each of the pulse delay units 12, 14, 16 will delay the input pulse by a predetermined amount in accordance with delay control data for that pulse stored in one of the buffer registers 18, 20, 22, 24. The commutator unit 26 controls the storage of delay control data in the buffer registers 18, 20, 22, 24 and the distribution of the delay control data from the buffer registers 18, 20, 22, 24 to the pulse delay units 12, 14, 16 during system operation.

As stated above, the pulse delay system 10 of FIG. 1 is a pipelined system. Thus, the system 10 can simultaneously process two or more pulses, each in accordance with a unique programmed delay value. In other words, a second pulse can be input to the first pulse delay unit 12 for processing in accordance with a second programmed delay before a first pulse being processed in accordance with a first programmed delay (that is different from the second programmed delay) has been output by the last pulse delay unit 16 in the chain. By allowing multiple pulses to be processed in the chain of pulse delay units 12, 14, 16 simultaneously, more efficient use of system resources is realized and processing speeds are increased dramatically.

To provide pipelined operation, each of the buffer registers 18, 20, 22, 24 is used to store delay control data (e.g., a delay control word) for one of the pulses currently being processed in the system 10. Thus, buffer register 18 might be used to store a delay control word corresponding to a first pulse propagating through the system 10, buffer register 20 to store a delay control word corresponding to a next pulse propagating through the system 10, and so on. Before a new pulse is input to the system 10 at the pulse input 30, a delay control word for the new pulse is delivered to the delay control data line 54. The commutator unit 26 then stores the delay control word in the next available buffer register 18, 20, 22, 24 by delivering a write signal to a corresponding write port 58 of the selected buffer register. The commutator unit 26 then delivers a two-bit selection signal (S0, S1) to a selection input 32 of the first pulse delay unit 12 identifying the buffer register that includes the delay control word corresponding to the new pulse. As will be described in greater detail, the selection signal is latched into the first pulse delay unit 12 before the new pulse is applied to pulse input 30. After the selection signal has been latched into the first pulse delay unit 12, the unit 12 retrieves a delay control bit from the corresponding buffer register (i.e., the one identified by the selection signal) and configures an internal pulse delay switch in accordance therewith. After the internal switch has been configured, the new pulse is injected at the pulse input 30.

As will be described in greater detail, the two-bit selection signal (S0, S1) for the new pulse flows through the system 10 from pulse delay unit to pulse delay unit in a bucket brigade fashion in a position preceding the corresponding pulse. In this manner, each of the subsequent pulse delay units can configure itself in accordance with the delay control word that is stored in the identified buffer register before the corresponding pulse arrives. Thus, each pulse being processed by the system 10 can have a different programmed delay value without affecting the delays applied to the other pulses.

Figure 2:
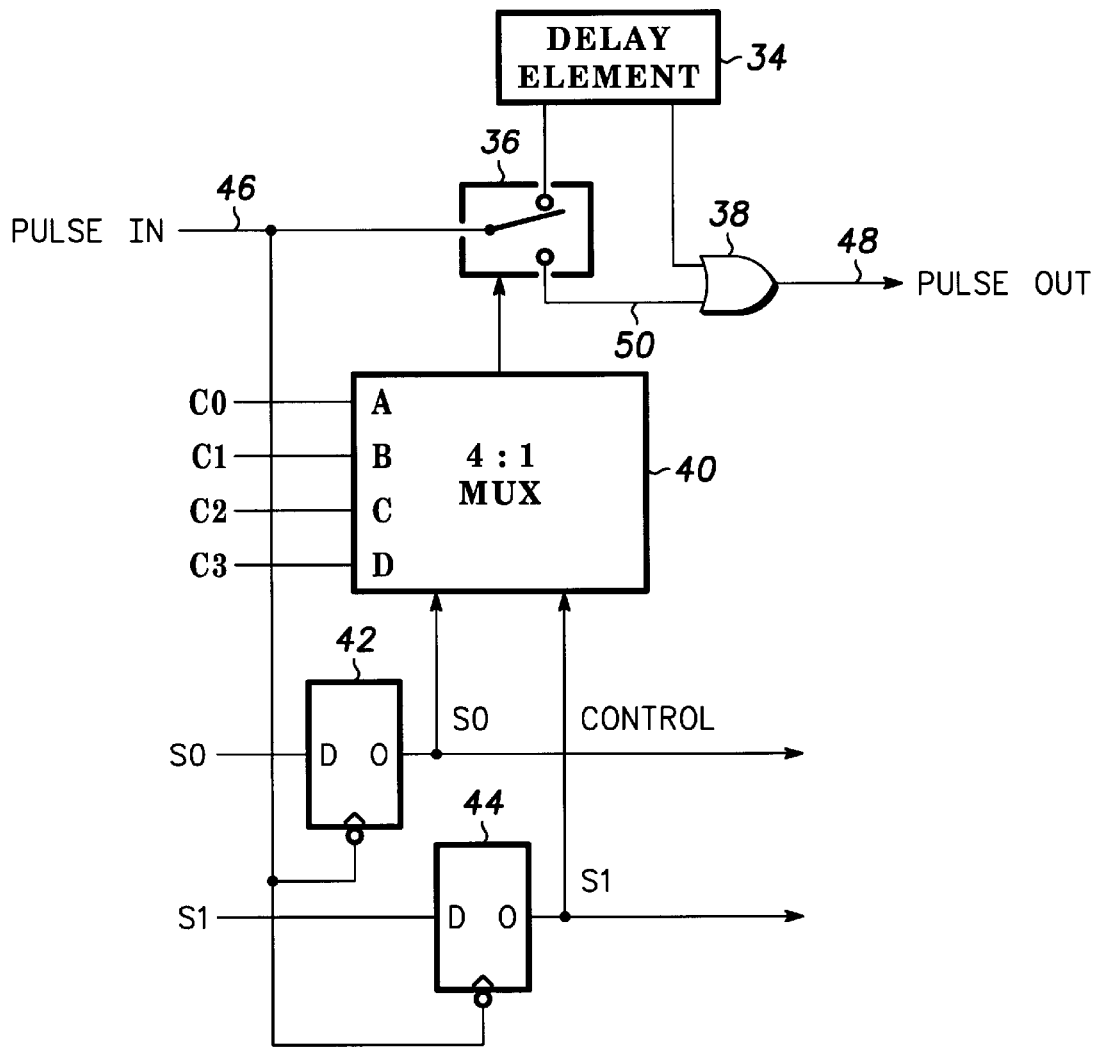
FIG. 2 is a block diagram illustrating a pulse delay unit that is used in the programmable pulse delay system of FIG. 1 in one embodiment of the present invention.

FIG. 2 is a block diagram illustrating a pulse delay unit 12 in accordance with one embodiment of the present invention. As shown, the pulse delay unit 12 includes: a delay element 34, a switch 36, an OR gate 38, a selection unit 40, and a pair of latches 42, 44. The pulse delay unit 12 also includes a pulse input 46 and a pulse output 48. As illustrated, a pulse injected at the pulse input 46 will flow through the switch 36 and eventually out of the pulse output 48. Depending upon the current switch setting, the pulse will either flow through the delay element 34 or through a bypass connection 50. The difference between the path length of the delay element 34 and the bypass connection 50 is the delay amount associated with the pulse delay unit 12. The switch 36 can include any type of device that selects between two or more outputs from a single input. The OR gate 38 is operative for passing the pulse to the pulse output 48 regardless of whether the pulse traveled though the delay element 34 or the bypass connection 50. The OR gate 38 can be replaced by any device that is capable of reliably passing the pulse to the output 48, such as a combiner structure or a wired-OR connection.

In a typical system, each successive pulse delay unit in the chain will have twice the delay amount of a preceding pulse delay unit in the chain to achieve a binary delay system. Thus, the binary value of the data control word for a pulse will be proportional to the total delay applied to the pulse using the data control word. Any of a number of different pulse delays can therefore be achieved for a particular pulse in the system by properly controlling the switches within the various pulse delay units 12, 14, 16. As in the illustrated embodiment, each delay unit will normally only be able to choose between one delay element 34 and the bypass connection 50. However, systems that utilize more than one delay element 34 (and thus require a switch 36 with three or more positions) can also be used in accordance with the present invention. Such systems will require more than one delay control bit, however, to control the switch 36.

The selection unit 40 is operative for selecting the source of the delay control bit that will be used to configure the switch 36 for a particular input pulse. The selection unit 40 includes a number of inputs C0, C1, C2, C3 that are each connected to one bit position in each of the buffer registers 18, 20, 22, 24 (i.e., the bit position corresponding to the pulse delay unit carrying the selection unit 40). The selection unit 40 receives the selection signal (S0, S1) that was originally generated by the commutation unit 26, and that was latched into the pulse delay unit 12, and uses it to select which of the inputs C0, C1, C2, C3 is to be coupled to the switch 36 to supply the delay control bit for a next pulse to be processed by the pulse delay unit 12. The switch 36 then modifies its switch setting in accordance with the delay control bit received from the selected input of the selection unit 40.

In the illustrated embodiment, the selection unit 40 is shown as a 4:1 multiplexer unit. It should be appreciated that virtually any type of switching device that is capable of selecting one of a number of different inputs in response to a selection signal can be used as the selection unit 40. The number of inputs into the selection unit 40 is equal to the number of buffer registers 18, 20, 22, 24 that are used in the system 10. This number is generally chosen based upon the number of pulses that are to be processed simultaneously in the system.

The latches 42, 44 are operative for shifting the selection signal originally generated by the commutator unit 26 down the chain of pulse delay units 12, 14, 16 in bucket brigade fashion. As illustrated, the latches 42, 44 are each clocked using the input pulses themselves to latch the next selection signal into the unit 12. In a preferred approach, the trailing edge of a present input pulse in the pulse delay unit 12 is used to latch the selection signal for the next input pulse into the unit 12. Because the "trailing edge" of the present pulse is used to clock the latches 42, 44, the present pulse will have traveled beyond the switch 36 (and thus will not be affected by a change in the position thereof) by the time the selection unit 40 has been reconfigured with the new selection signal. The "present" pulse then travels through the rest of the pulse delay units, latching the same selection signal into each of those units as it flows. In this manner, each successive pulse delay unit in the chain is able to configure itself in accordance with a corresponding delay control word before receiving the associated pulse.

The number of latches 42, 44 within each pulse delay unit 12 is related to the number of buffer registers in the system 10. That is, one latch will be needed for each binary digit required to address the selection unit 40. Therefore, in the embodiment of FIG. 2, two latches 42, 44 are required because two binary digits are needed to select one of four selection inputs C0, C1, C2, C3. In a preferred embodiment, D-type flip flops are used to provide the latch functionality. However, as will be apparent to persons of ordinary skill in the art, other alternative latching devices can also be used.

Referring back to FIG. 1, the system 10 receives a new delay control word for a next input pulse from a system controller (not shown) at the delay control data line 54. The system controller inputs the delay control word to the delay control data line 54 at least one pulse before the corresponding pulse is injected into the system 10 at pulse input 30 so that the commutator unit 26 has time to store the delay control word in an appropriate buffer register and generate a corresponding selection signal for delivery to the first pulse delay unit 12.

In a preferred embodiment, the delay control word for each input pulse is a digital binary signal having a number of bits that is equal to the number of pulse delay units 12, 14, 16 in the system 10. Each bit in the delay control word acts as the control value for a switch in one of the pulse delay units 12, 14, 16. Thus, if the bit has a value of 1, for example, the switch 36 (see FIG. 2) might assume a position where the corresponding delay element 34 is switched into the pulse flow path. If the bit has a value of 0, on the other hand, the switch 36 will assume a position where the bypass connection 50 is switched into the pulse flow path. The delay control word, therefore, represents the settings that are desired for all of the pulse delay units 12, 14, 16 in the chain for the corresponding input pulse. The pulse delay units 12, 14, 16 will not, however, all be set to the corresponding values within the delay control word at the same time. It should be appreciated that the delay control word can include more than one binary control bit (or one or more M-ary control symbols) for each of the pulse delay units 12, 14, 16 in accordance with the present invention. This technique can be used, for example, when more than one delay element exists within each pulse delay unit.

As illustrated in FIG. 1, each of the pulse delay units 12, 14, 16 in the system 10 is connected to a corresponding bit position in each of the buffer registers 18, 20, 22, 24 via data lines 60, 62, 64, and 66. Thus, the pulse delay units 12, 14, 16 can each retrieve an appropriate control bit for an incoming pulse and use the control bit to set the corresponding internal switch 36 on a pulse-by-pulse basis. As described above, the commutator unit 26 delivers a two bit selection signal (S0, S1) to the first pulse delay unit 12 for use with the next pulse to be input at pulse input 30. As described above with reference to FIG. 2, the two-bit selection signal is latched by latches 42 and 44 in response to the trailing edge of a previous pulse input into the system 10. Thus, the selection signal is input into the selection unit 40 which outputs the control bit in the corresponding buffer register 18, 20, 22, 24 to the switch 36. The control bit is then used to set the position of the switch 36 for the next pulse. After the switch 36 has been set, the new pulse flows through the pulse delay unit 12 and is appropriately delayed. The two-bit selection signal is then transferred down the chain of pulse delay units bucket brigade style so that each successive pulse delay unit has an appropriate delay amount as the corresponding pulse travels though the chain. Once the trailing edge of each pulse has passed the switch 36 in a particular pulse delay unit, the unit is able to change the setting of the switch 36 for the next pulse.

In the preferred embodiment, the commutator unit 26 operates in a sequential fashion. That is, it continually "commutates" each of the pulse delay units 12, 14, 16 between the buffer registers 18, 20, 22, 24 in a repetitive 3, 2, 1, 0 sequence. In a similar fashion, the commutator unit 26 stores new delay control words received on the delay control data line 54 in the buffer registers 18, 20, 22, 24 in a repetitive 3, 2, 1, 0 sequence. For example, after the commutator unit 26 has stored a delay control word in the last buffer register 24, the commutator unit 26 stores the next delay control word in the first buffer register 18 and the process repeats in a sequential manner. As can be appreciated, the number of buffer registers 18, 20, 22, 24 used in the system 10 will be selected so that the pulse associated with the delay control word currently stored in a buffer register will have passed the switch 36 in the last pulse delay unit 16 before the buffer register is rewritten.

A pulse delay system in accordance with the present invention will include at least two pulse delay units. The actual number of pulse delay units used in a particular system implementation will depend upon the range and resolution of delays that are required in a particular application. That is, the larger the number of individual delay states that is required by the system, the larger the number of pulse delay units that will be required. The commutator functionality can be implemented in hardware or software. In one embodiment, for example, the commutator unit 26 is implemented in software within the system controller unit. The buffer registers 18, 20, 22, 24 can be implemented using any of a large variety of different digital memory devices. For example, discrete hardware register units, portions of a conventional random access memory (RAM), or other memory devices can be used for the buffer registers.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A programmable pulse delay system for providing predetermined amounts of delay to each of successive pulses, comprising:

first conductive means providing the successive pulses;

second conductive means providing delay control information having delay control values corresponding to each of the successive pulses;

a plurality of pulse delay units coupled to said first conductive means and connected in series so that each pulse of the successive pulses injected into a first pulse delay unit in said plurality of pulse delay units propagates through each of said plurality of pulse delay units before being output by a last pulse delay unit in said plurality of pulse delay units, each of said plurality of pulse delay units including a switch; said switch being adapted to change a pulse delay of said pulse delay unit in response to said delay control value;

a plurality of memory units coupled to said plurality of pulse delay units and to said second conductive means, each of said plurality of memory units for storing said delay control values corresponding to each of the successive pulses propagating through said plurality of pulse delay units; and commutator means coupled to said memory units and to said pulse delay units for selectively coupling each successive pulse delay unit in said plurality of pulse delay units to the memory unit in said plurality of memory units which includes a delay control value corresponding to each of the successive pulses propagating through said plurality of pulse delay units.

2. The programmable pulse delay system claimed in claim 1, wherein:

said commutator means identifies said memory unit to each of said plurality of pulse delay units just prior to each of said successive pulses being input to said pulse delay unit.

3. The programmable pulse delay system claimed in claim 1, wherein:

each of said plurality of pulse delay units includes a control signal unit for retrieving said delay control value from a memory unit indicated by said commutator means for delivering said delay control value to a corresponding switch.

4. The programmable pulse delay system claimed in claim 1, wherein:

said plurality of pulse delay units processes multiple pulses simultaneously, each of said multiple pulses having a different programmed delay value.

5. The programmable pulse delay system claimed in claim 1, wherein:

said commutator means which generates selection signals corresponding to each of the successive pulses, said commutator means delivering said selection signals to each of said delay units before each of the successive pulses is input thereto.

6. The programmable pulse delay system claimed in claim 5, wherein:

said commutator means includes means for transferring said selection signal through said plurality of pulse delay units from pulse delay unit to pulse delay unit.

7. The programmable pulse delay system claimed in claim 6, wherein:

said means for transferring includes a latch for latching said selection signal into a pulse delay unit in response to a pulse propagating through said pulse delay unit.

8. The programmable pulse delay system claimed in claim 1, wherein:

said plurality of memory units includes a plurality of buffer registers.

9. A pulse delay unit for use in a pulse delay system having a plurality of pulse delay units connected in a serial arrangement for providing variable pulse delays to input pulses, said pulse delay unit comprising:

a pulse input;

a pulse output;

a pulse flow path between said pulse input and said pulse output;

a switch for changing a delay associated with said pulse flow path in response to a control signal;

a selection unit coupled to said switch for providing said control signal to said switch, said selection unit having a plurality of inputs, each of said plurality of inputs for connection to a different control signal source; and a commutator unit connected to said selection unit; said commmutator unit enabling said selection unit to choose one of said plurality of inputs of said selection unit for connection to said switch to provide said control signal to said switch based on a selection signal applied to said selection unit.

10. The pulse delay unit claimed in claim 9, further comprising:

means for changing said selection signal applied to said selection unit in response to a first pulse received at said pulse input.

11. The pulse delay unit claimed in claim 10, wherein:

said means for changing changes said selection signal in response to a trailing edge of said first pulse.

12. The pulse delay unit claimed in claim 11, wherein:

said means for changing changes said selection signal to a value associated with a second pulse in response to said trailing edge of said first pulse, said second pulse to be received at said pulse input after said first pulse.

13. The pulse delay unit claimed in claim 10, wherein:

said means for changing includes at least one flip flop unit.

14. A programmable pulse delay system comprising:

a plurality of pulse delay units connected in series so that a pulse injected into a first pulse delay unit in said plurality of pulse delay units propagates through each of said plurality of pulse delay units before being output by a last pulse delay unit in said plurality of pulse delay units, each of said plurality of pulse delay units including a switch for changing a pulse delay of said pulse delay unit in response to a control signal;

a plurality of memory units for storing delay control information having a value for each of the pulses being processed by said programmable pulse delay system, each memory unit in said plurality of memory units storing the value for each pulse being processed by the system; and a commutator unit for use in cycling each of said plurality of pulse delay units between said plurality of memory units, said memory units thereby being a source of control signal information for a corresponding switch.

15. The programmable pulse delay system claimed in claim 14, wherein:

said commutator unit controls the storage of delay control information for input pulses in said plurality of memory units.

16. The programmable pulse delay system claimed in claim 15, wherein:

said memory units store said delay control information in a repetitive, sequential manner.

17. The programmable pulse delay system claimed in claim 14, wherein:

said commutator unit generates a selection signal corresponding to a next pulse to be input into said programmable pulse delay system and delivers said selection signal to said first pulse delay unit.

18. The programmable pulse delay system claimed in claim 17, wherein:

said selection signal is indicative of a memory unit within said plurality of memory units that includes delay control information corresponding to said next pulse.

19. The programmable pulse delay system claimed in claim 14, wherein:

said plurality of memory units includes a plurality of buffer registers.

20. The programmable pulse delay system claimed in claim 19, wherein:

said commutator unit is coupled to a write port of each of said plurality of buffer registers.

* * * * *